(12) United States Patent
Okuda

(10) Patent No.: US 10,308,055 B2
(45) Date of Patent: Jun. 4, 2019

(54) RECORDING METHOD

(71) Applicant: Seiko Epson Corporation, Tokyo (JP)

(72) Inventor: Ippei Okuda, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 656 days.

(21) Appl. No.: 14/858,309

(22) Filed: Sep. 18, 2015

(65) Prior Publication Data

US 2016/0082763 A1 Mar. 24, 2016

(30) Foreign Application Priority Data

Sep. 19, 2014 (JP) ................................ 2014-191845
Jun. 19, 2015 (JP) ................................ 2015-123636

(51) Int. Cl.
B41M 5/00 (2006.01)
C09D 11/322 (2014.01)
C09D 11/54 (2014.01)
B41J 2/21 (2006.01)
B41M 5/50 (2006.01)

(52) U.S. Cl.
CPC .............. B41M 5/0017 (2013.01); B41J 2/21 (2013.01); B41M 5/50 (2013.01); C09D 11/322 (2013.01); C09D 11/54 (2013.01)

(58) Field of Classification Search
CPC ....... B41M 5/0017; B41M 5/50; C09D 11/54; Y10T 428/24802
See application file for complete search history.

(56) References Cited

U.S. PATENT DOCUMENTS

| 2005/0206702 | A1 | 9/2005 | Yamashita et al. |
| 2009/0233061 | A1 | 9/2009 | Irita |
| 2010/0055325 | A1 | 3/2010 | Sakai et al. |
| 2013/0044157 | A1 | 2/2013 | Sarkisian et al. |
| 2014/0043393 | A1 | 2/2014 | Takeuchi |

FOREIGN PATENT DOCUMENTS

| EP | 2 083 055 A1 | 7/2009 |
| EP | 2 090 624 A1 | 8/2009 |
| EP | 2 857 213 A1 | 4/2015 |
| EP | 2 894 203 A1 | 7/2015 |
| EP | 2 944 476 A1 | 11/2015 |
| JP | 2005-225114 A | 8/2005 |
| JP | 2009-196351 A | 9/2009 |
| JP | 2012-233162 A | 11/2012 |

Primary Examiner — Gerard Higgins
(74) Attorney, Agent, or Firm — Nutter McClennen & Fish LLP

(57) ABSTRACT

Disclosed is a recording method including attaching a reaction solution which forms a recording region S1 by attaching a reaction solution which includes an aggregating agent which is able to aggregate components of a color ink composition to a target recording medium with an attachment amount of 100 nmol/inch$^2$ to 1500 nmol/inch$^2$ of the aggregating agent, and attaching a color ink composition which forms a recording region S2 by attaching the color ink composition which includes a coloring material and a resin to the recording region S1 within 30 seconds of attaching the reaction solution.

15 Claims, 2 Drawing Sheets

RECORDING METHOD

BACKGROUND

1. Technical Field

The present invention relates to a recording method.

2. Related Art

Ink jet recording methods are able to record high definition images using a comparatively simple apparatus and have undergone rapid developments in various aspects. Among these, various studies have been carried out regarding obtaining higher image quality. For example, with an object of providing an ink jet recording method which is able to provide color images with a high image density and high quality without bleeding by simply attaching an optimum amount of a reaction solution for improving the fixing property and the like of an ink to a favorable position on a recording medium, JP-A-2005-225114 discloses an ink jet recording method which records an image by forming ink dots and reaction solution dots on the recording medium based on ink recording data and reaction solution recording data using an ink discharging head which discharges ink and a reaction solution discharging head which discharges a reaction solution which has a property of aggregating the ink, in which, with respect to a region in which ink dots are formed on the recording medium, reaction solution dots are formed with a recording duty of 100% by making the dot size uniform.

In a case of not using a reaction solution, the image quality deteriorates due to the aggregability on the obtained recorded matter decreasing and the like. On the other hand, in a case where the coating amount of the reaction solution is excessive, there are problems in that odor is generated from the obtained recorded matter, and additionally the durability of the recorded matter deteriorates.

The coating of the reaction solution may be performed by roller coating or ink jet coating. JPA-2005-225114 discloses carrying out coating by ink jet coating from the viewpoint of controlling a coating amount of a reaction solution since it is not possible to adjust the coating amount in roller coating.

However, even JP-A-2005-225114 does not completely solve the problem of a trade-off between improving the aggregability and the odor and the recorded matter durability. Therefore, there is a demand for a recording method which exhibits an effect of further improving the aggregability while having a small coating amount of the reaction solution.

SUMMARY

An advantage of some aspects of the invention is that it provides a recording method which is able to obtain recorded matter with favorable aggregability and printing durability and little recorded matter odor.

The present inventors carried out intensive research in order to solve the problem described above. As a result, the invention was completed by discovering that it is possible to solve the problem described above with a predetermined recording method.

That is, the invention is as follows.

(1) A recording method includes: attaching a reaction solution which forms a recording region S1 by attaching a reaction solution which includes an aggregating agent which is able to aggregate components of a color ink composition to a target recording medium with an attachment amount of 100 nmol/inch$^2$ to 1500 nmol/inch$^2$ of the aggregating agent; and attaching a color ink composition which forms a recording region S2 by attaching the color ink composition which includes a coloring material and a resin to the recording region S1 within 30 seconds of attaching the reaction solution.

(2) The recording method according to (1), wherein, in the attaching a reaction solution, the reaction solution is discharged as liquid droplets and attached to the target recording medium with an attachment density of 600 dpi or more×600 dpi or more.

(3) The recording method according to (1) or (2), wherein the target recording medium is an absorptive target recording medium or a low-absorptive recording medium.

(4) The recording medium according to any one of (1) to (3), wherein the content of the aggregating agent is 0.090 mol/1000 g or more to 0.91 mol/1000 g or less with respect to a total of the reaction solution.

(5) The recording medium according to any one of (1) to (4), wherein the components of the color ink composition which are aggregated by the aggregating agent include at least one of a pigment and the resin, as the coloring material.

(6) The recording medium according to any one of (1) to (5), wherein the aggregating agent includes at least one of a multivalent metal salt and an organic acid.

(7) The recording medium according to any one of (1) to (6), wherein, in the attaching a reaction solution and the attaching a color ink composition, attachment is performed by performing one scanning which discharges the reaction solution or the color ink composition from the ink jet head while changing relative positions of an ink jet head and the target recording medium.

(8) The recording medium according to any one of (1) to (7), wherein a temperature of the recording region S1 of the target recording medium is held at 38° C. or less from the attaching a reaction solution to the attaching a color ink composition.

(9) The recording medium according to any one of (1) to (8), wherein, in the attaching a color ink composition, the recording region S2 is formed by attaching the color ink composition which includes a coloring material and a resin to the recording region S1 in a state where, with respect to a total mass of 100 mass % of volatile components which are included in the reaction solution before attachment, a volatile component residual ratio of the reaction solution on the recording region S1 is 30 mass % or more.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
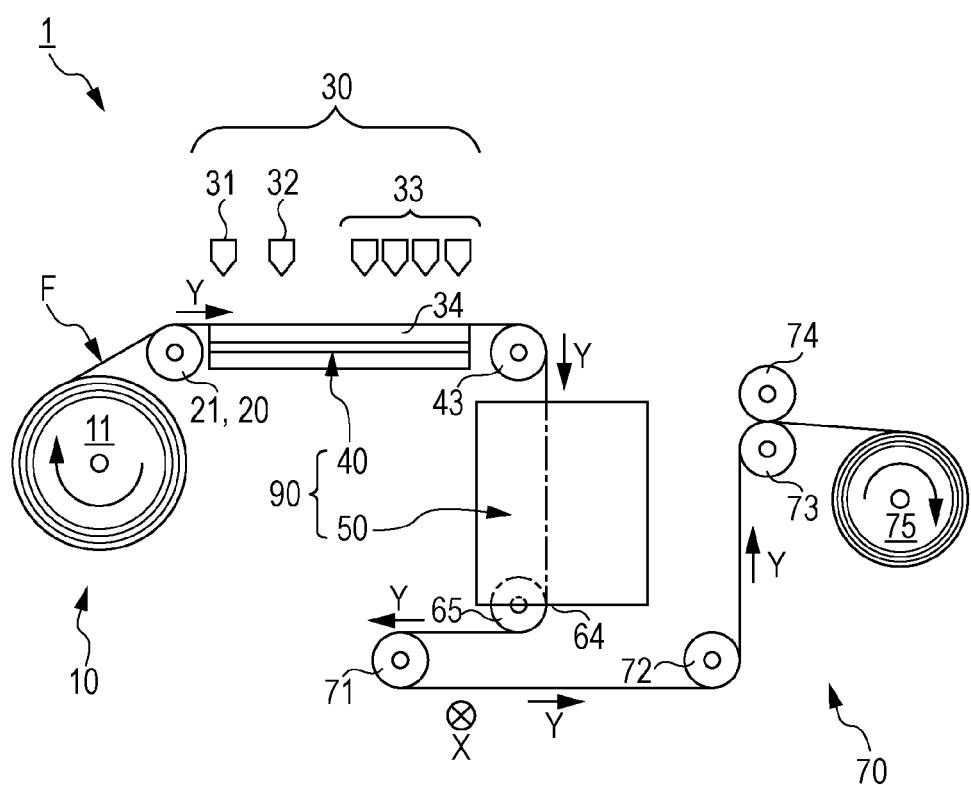
FIG. 1 is a diagram which shows a schematic of an example of an ink jet recording apparatus which may be used for the present embodiment.

Detailed description will be given below of an embodiment of the invention (referred to below as the "present embodiment") with reference to the diagrams as necessary; however, the invention is not limited thereto and various types of modifications are possible within a range which does not depart from the gist of the invention. Here, in the diagrams, the same reference numerals are given to the same elements and overlapping description thereof will be omitted. In addition, unless otherwise stated, positional relationships such as top, bottom, left, and right are based on the positional relationships shown in the diagram. Furthermore, the dimension ratios in the diagram are not limited to the ratios shown in the diagram.

Recording Method

A recording method of the present embodiment includes a reaction solution attaching step which forms a recording region S1 by attaching a reaction solution which includes an aggregating agent which is able to aggregate components of a color ink composition to a target recording medium with an aggregating agent attachment amount of 100 nmol/inch$^2$ to 1500 nmol/inch$^2$, and a color ink composition attaching step which forms a recording region S2 by attaching the color ink composition which includes a coloring material and a resin to the recording region S1 within 30 seconds of attaching the reaction solution.

There is a problem in that, as the attachment amount of the aggregating agent which is attached to the target recording medium increases, the odor which is generated from the obtained recorded matter increases and the durability of the recorded matter deteriorates. Therefore, the attachment amount of the aggregating agent is preferably close to the smallest amount at which the aggregability on the recorded matter is favorable. However, it is difficult to solve the problem of a trade-off between improving the aggregability and the odor and the recorded matter durability simply by reducing the attachment amount of the aggregating agent. For example, in a case where the target recording medium is an absorptive target recording medium or a low-absorptive target recording medium, there are cases where it is not possible to obtain the expected effect of the reaction solution due to the reaction solution permeating into the target recording medium in a case where the holding time is long after attaching a reaction solution. On the other hand, when the attachment amount of the reaction solution is increased, the problem does not easily occur; however, there is a problem in that the odor which is generated from the obtained recorded matter increases and the durability of the recorded matter deteriorates.

With respect to this, in the recording method of the present embodiment, by having the configuration described above, it is possible to solve the problem of the trade-off between improving the aggregability and the odor and the recorded matter durability with a smaller attachment amount of the aggregating agent regardless of the type of target recording medium.

Reaction Solution Attaching Step

The reaction solution attaching step forms a recording region S1 by attaching a reaction solution which includes an aggregating agent which is able to aggregate components of a color ink composition to a target recording medium with an aggregating agent attachment amount of 100 nmol/inch$^2$ to 1500 nmol/inch$^2$.

The means for attaching the reaction solution is not particularly limited; however, it is possible to use, for example, roller coating, spray coating, and ink jet coating. In a case of ink jet coating, it is possible to discharge a reaction solution from a nozzle of a line head or a serial head and attach the reaction solution to a target recording medium. In a line system which uses a line head, it is possible to form the recording region S1 on the target recording medium by fixing the head, moving (changing the relative position of) the target recording medium in a sub-scanning direction (the vertical direction of the target recording medium and the transport direction), and operating during the movement to discharge ink droplets from a nozzle opening of the head. In addition, in a serial system which uses a serial head, it is possible to form the recording region S1 on the target recording medium by moving (changing the relative position of) the head in a main scanning direction (the horizontal direction of the target recording medium and the width direction), and operating during the movement to discharge ink droplets from a nozzle opening of the head.

Among these, in the reaction solution attaching step, it is preferable to perform attachment by performing one scanning which discharges the reaction solution from the ink jet head while changing the relative positions of the ink jet head and the target recording medium. By using ink jet coating, it is possible to more precisely adjust the type of the reaction solution or the coating amount thereof, the coating amount in each place of the recording region S1, and the like, according to the type of the target recording medium. Due to this, there is a tendency for it to be possible to obtain recorded matter with favorable aggregability and printing durability and less recorded matter odor. In addition, in a case of attaching the reaction solution in one scanning (1 pass) in the line system described above, since bleeding or unevenness is easily generated, the invention is particularly useful.

The attachment amount of the aggregating agent is 100 nmol/inch$^2$ to 1500 nmol/inch$^2$, preferably 100 nmol/inch$^2$ to 1400 nmol/inch$^2$, and more preferably 100 nmol/inch$^2$ to 1250 nmol/inch$^2$. Furthermore, the upper limit is preferably 1000 nmol/inch$^2$ or less and more preferably 500 nmol/inch$^2$ or less and the lower limit is preferably 200 nmol/inch$^2$ or more. By the attachment amount of the aggregating agent being 100 nmol/inch$^2$ or more, the aggregability is further improved. In addition, by the attachment amount of the aggregating agent being 1500 nmol/inch$^2$ or less, it is possible to obtain recorded matter with favorable printing durability and less recorded matter odor. The attachment amount of the aggregating agent described above is the largest attachment amount in the recording region to which the aggregating agent is attached in the recording method of the present embodiment.

In the reaction solution attaching step, it is preferable to discharge the reaction solution as liquid droplets and attach the reaction solution to the target recording medium with a predetermined attachment density. The attachment density is preferably 600 dpi or more×600 dpi or more, more preferably 600 dpi or more×1200 dpi or more, and even more preferably 1200 dpi or more×1200 dpi or more. By the attachment density being 600 dpi or more×600 dpi or more, there is a tendency for the aggregability to be further improved. The upper limit of the attachment density is not limited, but is preferably 3600 dpi or less×3600 dpi or less. The attachment density is the attachment density as liquid droplets, that is, the number of ink droplets which are attached in a predetermined area.

Reaction Solution

The reaction solution includes an aggregating agent which is able to aggregate components of the color ink composition. The ink composition thickens or becomes insoluble due to the aggregating agent components in the reaction solution interacting with the ink composition. Due to this, it is possible to prevent landing interference and bleeding with regard to the ink composition which is attached thereafter, and it is possible to uniformly draw lines, fine images, and the like. The components of the color ink composition which are aggregated by the aggregating agent are not particularly limited, but, for example, at least one of a pigment and a resin is preferable.

Aggregating Agent

The aggregating agent is not particularly limited; however, examples thereof include at least one of a multivalent metal salt, an organic acid, and an organic acid salt. Among these, it is preferable to include at least one of the multivalent metal salt and the organic acid. By using a reaction solution which includes the multivalent metal salt, there is a tendency for the aggregating agent effect to be superior.

Multivalent Metal Salt

The multivalent metal salt is not particularly limited; however, for example, a multivalent metal salt of an inorganic acid or a multivalent metal salt of an organic acid is preferable. The multivalent metal salt is not particularly limited; however, examples thereof include salts of alkali earth metals of the second group in the periodic table (for example, magnesium and calcium), transition metals of the third group in the periodic table (for example, lanthanum), earth metals from the thirteenth group in the periodic table (for example, aluminum), and lanthanides (for example, neodymium). As the salts of the multivalent metals, carboxylate salt (formic acid, acetic acid, benzoate, and the like), sulfate, nitrate, chloride, and thiocyanate are favorable. Among these, preferable examples include calcium salt or magnesium salt of carboxylic acid (formic acid, acetic acid, benzoate, and the like), calcium salt or magnesium salt of sulfuric acid, calcium salt or magnesium salt of nitric acid, calcium chloride, magnesium chloride, calcium salt or magnesium salt of thiocyanic acid, and carboxylate salt is more preferable. Since carboxylate salt tends to have a strong odor, the invention is particularly useful. Here, the multivalent metal salt may be used as one type individually or may be used in a combination of two or more types.

Organic Acid or Salt Thereof

The organic acid or salt thereof is not particularly limited; however, examples thereof include phosphoric acid, oxalic acid, malonic acid, citric acid, or salts thereof. Among these, a monovalent, divalent, or higher valency carboxylic acid is preferable. Since the carboxylic acid tends to have a strong odor, the invention is particularly useful. Here, the organic acid or the salt thereof may be used as one type individually or may be used in a combination of two or more types.

The content (mol/1000 g) of the aggregating agent is preferably 0.090 to 0.91 with respect to the total amount of the reaction solution, more preferably 0.10 to 0.90, even more preferably 0.20 to 0.90, even more preferably 0.30 to 0.90, and yet more preferably 0.50 to 0.90. By the content being within the range described above, there is a tendency for the effect of the aggregating agent to be superior.

The reaction solution is able to include other components as necessary. The other components are not particularly limited; however, examples thereof include water which is a volatile component, an organic solvent which is a volatile component, a surfactant, and the like.

Water

Examples of the water include water from which ionic impurities are removed as much as possible such as pure water such as ion-exchanged water, ultrafiltration water, reverse osmosis water, and distilled water, and ultra-pure water. In addition, when using water which is sterilized by ultraviolet irradiation, addition of hydrogen peroxide, and the like, it is possible to prevent the generation of molds or bacteria in a case of storing the ink for long periods. Due to this, there is a tendency for the storage stability to be further improved.

The content of the water is preferably 40 mass % to 80 mass % with respect to the total amount of the reaction solution, more preferably 45 mass % to 75 mass %, and even more preferably 50 mass % to 70 mass %. By the content of water being within the range described above, it is possible to lower the viscosity of the ink composition.

Organic Solvent

The organic solvent is not particularly limited; however, examples thereof include alcohols or glycols such as glycerine, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethyl formamide, N,N-dimethyl acetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethyl urea. Among these, a water-soluble organic solvent of 1,2-hexanediol, propylene glycol, and the like is preferable.

The content of the organic solvent is preferably 10 mass % to 30 mass % with respect to the total amount of the reaction solution, more preferably 12.5 mass % to 30 mass %, and even more preferably 15 mass % to 30 mass %. By the content of the organic solvent being within the range described above, there is a tendency for the effect of the aggregation agent to be further improved.

Surfactant

The surfactant is not particularly limited; however, for example, at least any of an acetylene glycol-based surfactant, a fluorine-based surfactant, and a silicone-based surfactant is preferable.

The acetylene glycol-based surfactant is not particularly limited; however, for example, one or more types selected from alkylene oxide adducts of 2,4,7,9-tetramethyl-5-decyne-4,7-diol and 2,4,7,9-tetramethyl-5-decyne-4,7-diol, and alkylene oxide adducts of 2-4-dimethyl-5-decyne-4-ol and 2-4-dimethyl-5-decyne-4-ol are preferable. Commercial products of the acetylene glycol-based surfactant are not particularly limited; however, examples thereof include Olfine 104 series or E series such as Olfine E1010 (product name, manufactured by Air Products Japan, Inc.), Surfynol 465 or Surfynol 61 (product name, manufactured by Nissin Chemical Industry Co., Ltd.), and the like. The acetylene glycol-based surfactant may be used as one type individually or may be used in a combination of two or more types.

The fluorine-based surfactant is not particularly limited; however, examples thereof include perfluoroalkyl sulphonate, perfluoroalkyl carboxylate salt, perfluoroalkyl phosphoric acid ester, a perfluoroalkyl ethylene oxide adduct, perfluoroalkyl betaine, and a perfluoroalkyl amine oxide compound. Commercial products of the fluorine-based surfactant are not particularly limited; however, examples thereof include S-144 and S-145 (manufactured by Asahi Glass Co., Ltd.); FC-170C, FC-430, and Fluorad-FC4430 (manufactured by 3M Japan Ltd.); FSO, FSO-100, FSN, FSN-100, and FS-300 (manufactured by Dupont Corp.); FT-250 and 251 (manufactured by Neos Co., Ltd.), and the like. The fluorine-based surfactant may be used as one type individually or may be used in a combination of two or more types.

Examples of the silicon-based surfactant include a polysiloxane-based compound, a polyether-modified organosiloxane, and the like. Commercial products of the silicon-based surfactant are not particularly limited; however, specific examples thereof include BYK-306, BYK-307, BYK-333, BYK-341, BYK-345, BYK-346, BYK-347, BYK-348, and BYK-349 (the above are product names, manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are product names, manufactured by Shin-Etsu Chemical Co., Ltd.), and the like.

The content of the surfactant is preferably 0.10 mass % to 5.0 mass % with respect to the total mass of the reaction solution and more preferably 0.10 mass % to 3.0 mass %. By the content of the surfactant being within the range described above, there is a tendency for the wettability of the reaction solution which is attached to the target recording medium to be further improved.

Color Ink Composition Attaching Step

The color ink composition attaching step forms a recording region S2 by attaching (starting the attachment) the color ink composition which includes a coloring material and a resin to the recording region S1 within 30 seconds of attaching the reaction solution (finishing the attachment). In the color ink composition attaching step, it is possible to discharge a color ink composition from a nozzle of a line head or a serial head by an ink jet method and attach the color ink composition to the target recording medium.

Among these, in the color ink composition attaching step, it is preferable to perform the attachment by performing one scanning which discharges the color ink composition from the ink jet head while changing the relative positions of the ink jet head and the target recording medium. By using ink jet coating, it is possible to more precisely adjust the type of the reaction solution or the coating amount thereof, the coating amount in each place of the recording region S2, and the like according to the type of the target recording medium. Due to this, there is a tendency for it to be possible to obtain recorded matter with favorable aggregability and printing durability and less recorded matter odor. In addition, in a case of attaching the reaction solution in one scanning (1 pass) in the line system described above, since bleeding or unevenness is easily generated, the invention is particularly useful. Here, a step of drying at least a portion of the color ink composition which is coated on the target recording medium during the color ink composition attaching step or after the color ink composition attaching step may be further provided.

The attachment amount of the color ink composition is preferably 1.0 mg/inch$^2$ to 10 mg/inch$^2$, more preferably 3.0 mg/inch$^2$ to 9.0 mg/inch$^2$, and even more preferably 5.0 mg/inch$^2$ to 8.0 mg/inch$^2$. By the attachment amount of the color ink composition being 1.0 mg/inch$^2$ or more, there is a tendency for the odor of the recorded matter to be suppressed and the durability to be further improved. In addition, by the attachment amount of the color ink composition being 10 mg/inch$^2$ or less, there is a tendency for the odor of the recorded matter to be suppressed and the durability to be further improved. The attachment amount of the color ink composition described above is the largest attachment amount in the recording region to which the color ink composition is attached using the recording method of the present embodiment.

In the recording method of the present embodiment, the recording region S2 is formed by attaching the color ink composition to the recording region S1 within 30 seconds of attaching the reaction solution as described above. In the time T (also referred to below as a holding time T) from the attachment (finishing the attachment) of the reaction solution to the target recording medium to the attachment (starting the attachment) of the color ink composition to the target recording medium, it is possible to prepare to attach the next color ink composition or to leave the target recording medium to stand by transporting the target recording medium, moving the head, or the like. The time T is 30 seconds or less, preferably 20 seconds or less, more preferably 17.5 seconds or less, even more preferably 15 seconds or less, yet more preferably 10 seconds or less, and particularly preferably 7 seconds or less. In addition, the lower limit of the time T is 0 seconds or more and is not limited, but is preferably more than 0 seconds from the point that it is easy to perform the color ink composition attaching step, more preferably 0.001 seconds or more, even more preferably 0.01 seconds or more, even more preferably 0.1 seconds or more, even more preferably 1 second or more, and even more preferably 2 seconds or more. By the holding time T being 30 seconds or less, the aggregability is further improved.

From the reaction solution attaching step to the color ink composition attaching step, the temperature of the recording region S1 of the target recording medium is preferably held at a predetermined temperature. The temperature is preferably 45° C. or less, more preferably 40° C. or less, even more preferably 38° C. or less, yet more preferably 35° C. or less, particularly preferably 30° C. or less, and more particularly preferably 25° C. or less. The lower limit is preferably 10° C. or higher and more preferably 15° C. or higher. In a case of rapidly drying the reaction solution by heating the target recording medium before the attaching a color ink composition or during the attaching a color ink composition, it is possible to dry the reaction solution on the target recording medium before the reaction solution permeates into the target recording medium and due to this, it is possible to suppress the permeation. Therefore, it is possible to carry out the reaction between the reaction solution and the color ink composition comparatively efficiently. However, since there is a tendency for the nozzles of the ink jet head to receive heat as the target recording medium is heated and for non-discharging nozzles to be generated due to thickening of the color ink composition in the nozzles, the temperature described above is preferably as described above or less. On the other hand, in a case of attaching the target recording medium at a normal temperature without heating before the color ink composition attaching step or during the color ink composition attaching step, it is possible to reduce the generation of discharge failures, which is preferable, and moreover, when using the invention, it is possible to efficiently carry out the reaction between the reaction solution and the color ink composition. Here, non-discharging nozzles may also be generated in the ink jet head for the reaction solution in the same manner. In addition, from the reaction solution attaching step to the color ink composition attaching step, it is preferable to keep the temperature of the recording region S1 of the target recording medium within the range described above from the point of rapidly performing the reaction solution attaching step and the color ink composition attaching step in succession.

In the color ink composition attaching step, it is preferable to form the recording region S2 by attaching the color ink composition which includes a coloring material and a resin to the recording region S1 in a state where, with respect to the total mass 100 mass % of the volatile components which are included in the reaction solution before attachment, the volatile component residual ratio of the reaction solution on the recording region S1 is 30 mass % or more. The volatile component residual ratio is preferably 30 mass % or more with respect to the total amount of the volatile components which are included in the reaction solution before attachment, more preferably 50 mass % or more, even more preferably 70 mass % or more, yet more preferably 75 mass % or more, still more preferably 80 mass % or more, and particularly preferably 90 mass % or more. The upper limit is 100 mass % or less. By the volatile component residual ratio being 30 mass % or more, there is a tendency for the aggregability to be further improved and there is an advantage in the point that it is not necessary to shorten the recording time or to dry the reaction solution by heating the target recording medium. Here, the "reaction solution before attachment" has the meaning of the state of the reaction solution which to be coated on the target recording medium in the reaction solution attaching step before attachment. Here, it is possible to determine the volatilization amount of the volatile components using the method described in the Examples.

Color Ink Composition

The color ink composition includes a coloring material and a resin. The color ink composition is aggregated by reacting with the aggregating agent and, due to this, the aggregability of the obtained recorded matter is further improved.

Coloring Material

The coloring material is not particularly limited; however, examples thereof include pigments.

The pigment which is used for a black ink is not particularly limited; however, examples thereof include No. 2300, No. 900, MCF88, No. 33, No. 40, No. 45, No. 52, MA7, MA8, MA100, No. 2200B, and the like (the above are manufactured by Mitsubishi Chemical Corp.); Raven 5750, Raven 5250, Raven 5000, Raven 3500, Raven 1255, Raven 700, and the like (the above are manufactured by Carbon Columbia Corp.); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.); and Color Black FW1, Color Black FW2, Color Black FW2V, Color Black FW18, Color Black FW200, Color Black S150, Color Black S160, Color Black S 170, Printex 35, Printex U, Printex V, Printex 140U, Special Black 6, Special Black 5, Special Black 4A, and Special Black 4 (the above manufactured by Degussa Corp.).

The pigment which is used for a white ink is not particularly limited; however, examples thereof include white inorganic pigments of C.I. Pigment White 6, 18, and 21, titanium oxide, zinc oxide, zinc sulfide, antimony oxide, and zirconium oxide. It is also possible to use a white organic pigment such as white hollow resin particles and polymer particles apart from the white inorganic pigment.

The pigment which is used for a yellow ink is not particularly limited; however, examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment which is used for a magenta ink is not particularly limited; however, examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 58 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; or C.I. Pigment Violet 19, 23, 32, 33, 36, 38, 43, and 50.

The pigment which is used for a cyan ink is not particularly limited; however, examples thereof include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

In addition, the pigments which are used for color inks apart from magenta, cyan, and yellow are not particularly limited; however, examples thereof include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

It is preferable to obtain the pigment described above as a pigment dispersing agent which is obtained by being dispersed in water using a dispersing agent, or by dispersing a self-dispersion type surface treatment pigment, in which a hydrophilic group is introduced to the pigment particle surface using a chemical reaction, in water, or to add a pigment dispersing agent which is obtained by dispersing a pigment which is covered with a polymer in water to an ink composition.

The dispersing agent described above is not particularly limited; however, it is possible to use, for example, polymer dispersing agents (proteins such as glue, gelatin, casein, and albumen, natural rubbers such as Arabian rubber and Tragacanth rubber, glucosides such as saponin, alginic acid-fermented methyl cellulose such as alginic acid and propylene glycol ester, alginic acid triethanol amine, and alginic acid ammonium, cellulose derivatives such as carboxylmethyl cellulose and ethylhydroxy cellulose, polyvinyl alcohols, polypyrrolidones, acrylic resins such as polyacrylic acid, acrylic acid-acrylnitrile copolymers, acrylic acid potassium-acrylnitrile copolymers, vinyl acetate-acrylic acid ester copolymers, and acrylic acid-acrylic acid ester copolymers, styrene-acrylic resins such as styrene-acrylic acid copolymers, styrene-methacrylic acid copolymers, styrene-methacrylic acid-acrylic acid ester copolymers, and styrene-m-methylstyrene-acrylic acid copolymers, styrene-maleic acid copolymers, styrene-maleic anhydride copolymers, vinylnaphthalene-acrylic acid copolymers, vinyl acetate-based copolymers and salts thereof such as vinyl acetate-ethylene copolymer, vinyl acetate-aliphatic vinylethylene copolymer, vinyl acetate-maleate copolymer, vinyl acetate-croton copolymer, and vinyl acetate-acrylic acid copolymer) or surfactants (various types of anionic surfactants, nonionic surfactants, and amphoteric surfactants).

A self-dispersion type surface treatment pigment to which the hydrophilic group described above is introduced is able to be dispersed or dissolved in water without a dispersing agent by a surface treatment such as directly bonding a carboxyl group and a salt thereof with the surface of the pigment. In detail, it is possible to obtain the pigment by grafting a functional group or molecules which include a functional group to the surface of the pigment by a vacuum plasma physical treatment or a chemical treatment which uses an oxidizing agent of sodium hypochlorite or ozone. The functional group which is grafted to one pigment particle may be a single type or a plurality of types. The type and amount of the grafted functional group may be appropriately determined while considering dispersion stability in the ink, the color concentration, and the drying property on the ink jet head front surface.

In addition, the pigment which is covered with the polymer described above is not particularly limited; however, it is possible to obtain the pigment, for example, by performing emulsion polymerization in water using a monomer which is able to be copolymerized with a dispersing agent (a copolymeric monomer) and a photo radical polymerization initiator after dispersing the pigment using the dispersing agent which has a polymeric group. Among the polymers, it is possible to favorably use polymers formed by a monomer or oligomer which has at least any of an acryloyl group, a methacryloyl group, a vinyl group, and an aryl group as a double bond being polymerized in accordance with a polymerization method known in the art which uses a photo radical polymerization initiator. It is possible to use a general method for the emulsion polymerization and the polymerization proceeds due to free radicals which are generated by thermal decomposition of a water-soluble photo radical polymerization initiator in the presence of an emulsifying agent.

The pigment and the dispersing agent which configure the pigment dispersing agent may be each used as one type individually or may be used in a combination of two or more types.

The content amount of the coloring material is preferably 0.50 to 5.0 mass % and more preferably 1.0 to 4.0 mass % with respect to the total amount of the color ink composition.

Resin

The resins which may be included in the color ink composition are not particularly limited; however, examples thereof include one of resin fine particles and water-soluble resins. Since, by using the resin fine particles, the pigment is fixed to the target recording medium by the resins fusing with each other in the resin fine particles and the resins and the pigment fusing with each other, it is possible to make the scratch resistance and the adhesion of the image portion of the recorded matter more favorable. Among resin fine particles, a urethane-based resin, an acryl-based resin, and a polyethylene-based resin are preferable.

Examples of the urethane-based resin include a urethane resin emulsion. The urethane resin emulsion is not particularly limited as long as the urethane resin emulsion is a resin emulsion which has a urethane bond in the molecule and examples thereof include a polyether type urethane resin which includes an ether bond in the main chain, a polyester type urethane resin which includes an ester bond in the main chain, and a polycarbonate type urethane resin which includes a carbonate bond in the main chain. Commercial products of the urethane resin emulsion described above are not particularly limited; however, examples thereof include Sancure 2710 (a product name manufactured by The Lubrizol Corp.), Permarin UA-150 (a product name manufactured by Sanyo Chemical Industries, Ltd.), Superflex 460, 470, 610, and 700 (product names manufactured by Dai-ichi Kogyo Seiyaku Co., Ltd.), NeoRez R-9660, R-9637, and R-940 (product names manufactured by Kusumono Chemicals Ltd.), Adeka BONTIGHTER HUX-380 and 290K (product names manufactured by Adeka Corp.), and Takerack (a registered trademark) W-605, W-635, and WS-6021 (the above are product names, Mitsui Chemicals, Inc.), Polyether (Taisei Finechemical Co., Ltd., product name, Tg=20° C.)

Examples of the acryl-based resin include an acryl resin emulsion. The acryl resin emulsion is not particularly limited; however, examples thereof include an emulsion where (meth)acryl-based monomers such as (meth)acrylic acid and (meth)acrylic acid ester are polymerized, or an emulsion where (meth)acryl-based monomers and other monomers are copolymerized. Commercial products of the acryl resin fine particles are not particularly limited; however, examples thereof include Mowinyl 966A (product name manufactured by Nippon Synthetic Chemical Industry Co., Ltd.), Microgel E-1002 and Microgel E-5002 (the above are product names, manufactured by Nippon Paint Co., Ltd.), Bonkote 4001 and Bonkote 5454 (the above are product names, manufactured by DIC Corp.), SAE 1014 (a product name, manufactured by Zeon Corp.), Saibinorl SK-200 (product name, manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (the above are product names, manufactured by BASF Corp.), and NK Binder R-5HN (product name manufactured by Shin-Nakamura Chemical Co., Ltd., solid content 44%).

Among these, at least one type selected from a group formed of a (meth)acryl-based resin and a styrene-(meth)acrylic acid copolymer-based resin is preferable, at least one type selected from a group formed of an acryl-based resin and a styrene-acrylic acid copolymer-based resin is more preferable, and a styrene-acrylic acid copolymer-based resin is even more preferable. Here, the copolymers described above may take any form out of a random copolymer, a block copolymer, an alternating copolymer, and a graft copolymer.

The resin fine particles may be used as one type individually or may be used in a combination of two or more types.

Among the resin fine particles described above, it is particularly preferable to include an aggregable resin. By the ink composition including an aggregable resin, there is a tendency for unevenness and bleeding to be further suppressed. The resin fine particles preferably have a property of aggregating when mixing a resin water solution (also simply referred to below as a "resin water solution"; the resin water solution having the meaning of a resin liquid (a resin aqueous medium liquid) which has water as a medium and including both water solutions and water dispersions) which includes the 1 mass % of resin fine particles and 0.085 mol/L of a calcium nitrate water solution (also simply referred to below as a "calcium nitrate water solution"). The resin fine particles more preferably have a property of aggregating when mixing 3 mL of the resin water solution described above and 3 mL or less of the calcium nitrate water solution among these, and, when these are defined as an aggregable resin, the resin fine particles even more preferably have a property of aggregating when mixing 3 mL of the resin water solution and 1.0 mL or less of the calcium nitrate water solution. The volume of the calcium nitrate water solution to be mixed described above is not limited but is able to be set to 0.1 mL or more.

The aggregable resin is not particularly limited; however, examples thereof include a polyethylene-based resin (for example, a product name "Chemipearl S650" manufactured by Mitsui Chemicals, Inc.), a polyethylene-based resin (for example, a product name "AQ515" manufactured by BYK Japan K.K.), and a polyester-based resin (for example, a product name "KT8701" manufactured by Unitika Ltd.).

The content of the resin is preferably 0.50 mass % to 5.0 mass % with respect to the total amount of the ink composition, more preferably 1.0 mass % to 4.0 mass %. By being within the range described above, there is a tendency for the water resistance and the scratch resistance of the recorded matter to be superior and, additionally, there is a tendency for the long-term preservation stability of the ink composition to be excellent and for it to be possible to decrease the viscosity of the ink composition in particular.

Water

It is possible to use, for example, the examples of water given for the reaction solution composition as water. The content of the water is preferably 50 mass % to 90 mass % with respect to the total amount of the color ink composition, more preferably 60 mass % to 90 mass %, and even more preferably 60 mass % to 85 mass %.

Organic Solvent

In addition, the color ink composition may include an organic solvent as a volatile component. The organic solvent is not particularly limited; however, it is possible to use the examples of organic solvents given in the reaction solution composition. The content of the organic solvent is preferably 5 mass % to 30 mass % with respect to the total amount of the color ink composition, more preferably 10 mass % to 25 mass %, and even more preferably 15 mass % to 25 mass %. By the content of the organic solvent being within the range described above, the scratch resistance of the recorded matter is excellent and it is possible to lower the viscosity of the ink.

Surfactant

In addition, the color ink composition may include a surfactant. The surfactant is not particularly limited; however, it is possible to use the examples of surfactants given in the reaction solution composition. The content of the surfactant is preferably 0.10 mass % to 5.0 mass % with respect to the total amount of the color ink composition and more preferably 0.10 mass % to 3.0 mass %. By the content of the surfactant being within the range described above, there is a tendency for the wettability of the color ink composition which is attached to the target recording medium to be further improved. In addition, by including a resin and forming a resin coated film on the target recording medium, it is possible for the scratch resistance of the recorded matter to be excellent by sufficiently fixing the ink composition on the target recording medium.

Other Components

It is also possible to appropriately add various types of additive agents such as a dissolution assisting agent, a viscosity adjusting agent, a pH adjusting agent, an antioxidant, a preservative, an antifungal agent, a corrosion inhibitor, and a chelating agent for catching metal ions which influence the dispersion to the color ink composition in order to favorably maintain the preservation stability and the discharge stability from a head, to improve clogging, or to prevent deterioration of the ink composition.

Target Recording Medium

Examples of the target recording medium include an absorptive target recording medium, a low-absorptive target recording medium, or a non-absorptive target recording medium. Since the absorptive target recording medium or the low-absorptive recording medium among these have a comparatively high reaction solution absorbency, the recording method of the invention is particularly useful and the invention is particularly useful in a case of using an absorptive target recording medium.

The absorptive target recording medium is not particularly limited; however, examples thereof include plain paper such as electrophotographic paper with high ink permeability, ink jet paper (ink jet paper which is provided with an ink absorbing layer which is configured from silica particles or alumina particles, or an ink absorbing layer which is configured from hydrophilic polymers such as polyvinyl alcohol (PVA) or polyvinyl pyrrolidone (PVP)), art paper which is used for general off-set printing with comparatively low ink permeability, coated paper, cast paper, and the like.

The low-absorptive target recording medium is not particularly limited; however, examples thereof include coated paper which is provided with a coating layer for receiving an oil-based ink on the surface. The coated paper is not particularly limited; however, examples thereof include printing paper such as art paper, coated paper, and matte paper.

The non-absorptive target recording medium is not particularly limited; however, examples thereof include films or plates of plastics such as polyvinyl chloride, polyethylene, polypropylene, and polyethylene terephthalate (PET), plates of metals such as iron, silver, copper, and aluminum, metal plates or plastic films which are manufactured by vapor depositing various types of the metals, plates of an alloy such as stainless steel and brass, and the like.

Here, the "low-absorptive target recording medium" or the "non-absorptive target recording medium" refers to a target recording medium where the quantity of water absorption at 30 msec from the start of contact is 10 mL/m$^2$ or less according to the Bristow method. The Bristow method is the most widespread method for measuring the quantity of liquid absorption in a short time and is also adopted by the Japan Technical Association of Pulp and Paper (JAPAN TAPPI). The details of the testing methods are described in "Paper and Cardboard-Liquid Absorbency Testing Method-Bristow method" which is specification No. 51 in "JAPAN TAPPI Paper Pulp Testing Methods 2000". Here, the low-absorptive target recording medium refers to a target recording medium where the quantity of water absorption described above is 5 mL/m$^2$ or more to 10 mL/m$^2$ or less. On the other hand, the absorptive target recording medium refers to a target recording medium where the quantity of water absorption described above exceeds 10 mL/m$^2$.

Recording Apparatus

FIG. 1 is a diagram which shows a schematic of an example of an ink jet recording apparatus 1 which may be used for the present embodiment. As shown in FIG. 1, the ink jet recording apparatus 1 is provided with a feeding section 10 for the target recording medium, a transport section 20, a recording section 30, a drying apparatus 90, and a discharge section 70. In addition, the ink jet recording apparatus 1 is also provided with a pre-heater which is not shown in the diagram as necessary and the target recording medium F is heated from the beginning as necessary.

Among these, the drying apparatus 90 has a first drying section 40 which performs a step of drying the target recording medium and a second drying section 50 which dries the recorded matter which is obtained by the recording method according to the present embodiment as necessary.

In addition, the feeding section 10 is provided so as to be able to feed a target recording medium F in a roll form to the transport section 20. In detail, the feeding section 10 has a roll medium holder 11 and the roll medium holder 11 holds the target recording medium F in roll form. Then, the configuration is set to be able to feed the target recording medium F to the transport section 20 on the downstream side in the sending direction Y by rotating the target recording medium F in roll form.

Furthermore, the transport section 20 is provided so as to be able to transport the target recording medium F, which is sent from the feeding section 10, to the recording section 30. In detail, the transport section 20 has a first sending roller 21 and is configured so as to be able to transport the sent target recording medium F to the recording section 30 further to the downstream side in the sending direction Y.

In addition, the recording section 30 is provided so as to be able to carry out recording by discharging the ink composition by coating the reaction solution with respect to the target recording medium F which is sent from the transport section 20. In detail, the recording section 30 is provided with heads 31 and 32 which perform the reaction solution attaching step, a recording head 33 which performs the color ink composition attaching step, and a platen 34 as a medium-supporting section.

Out of these, the platen 34 is provided so as to be able to support the target recording medium F from the rear surface. In addition, the platen 34 is provided with the first drying section 40 which dries the reaction solution which is coated on the target recording medium F and the ink composition which is discharged onto the target recording medium F as necessary. Furthermore, a second sending roller 43 is provided on the downstream side from the platen 34 in the sending direction Y. Then, the second sending roller 43 is configured so as to be able to send the recorded target recording medium F to the second drying section 50 which is on the downstream side in the sending direction Y.

In addition, the second drying section 50 is configured so as to be able to further dry the reaction solution which is coated on the target recording medium F and the ink composition which is discharged onto the target recording medium F. Furthermore, a third sending roller 65 is provided in the vicinity of an outlet 64 of the second drying section 50. The third sending roller 65 is arranged so as to come into contact with the rear surface of the target recording medium F and is configured so as to be able to send the target recording medium F to the discharge section 70 which is on the downstream side in the sending direction Y.

Furthermore, the discharge section 70 is provided so as to be able to send the target recording medium F which is sent from the second drying section 50 further to the downstream side in the sending direction Y and discharge the target recording medium F to the outside of the ink jet recording apparatus 1. In detail, the discharge section 70 has a fourth sending roller 71, a fifth sending roller 72, a sixth sending roller 73, a seventh sending roller 74, and a winding roller 75. Out of these, the fourth sending roller 71 and the fifth sending roller 72 are arranged so as to come into contact with the front surface of the target recording medium F. In addition, the sixth sending roller 73 and the seventh sending roller 74 are arranged so as to form a pair of rollers. Then, the target recording medium F which is discharged by the sixth sending roller 73 and the seventh sending roller 74 is provided so as to be wound by the winding roller 75.

Figure 2:
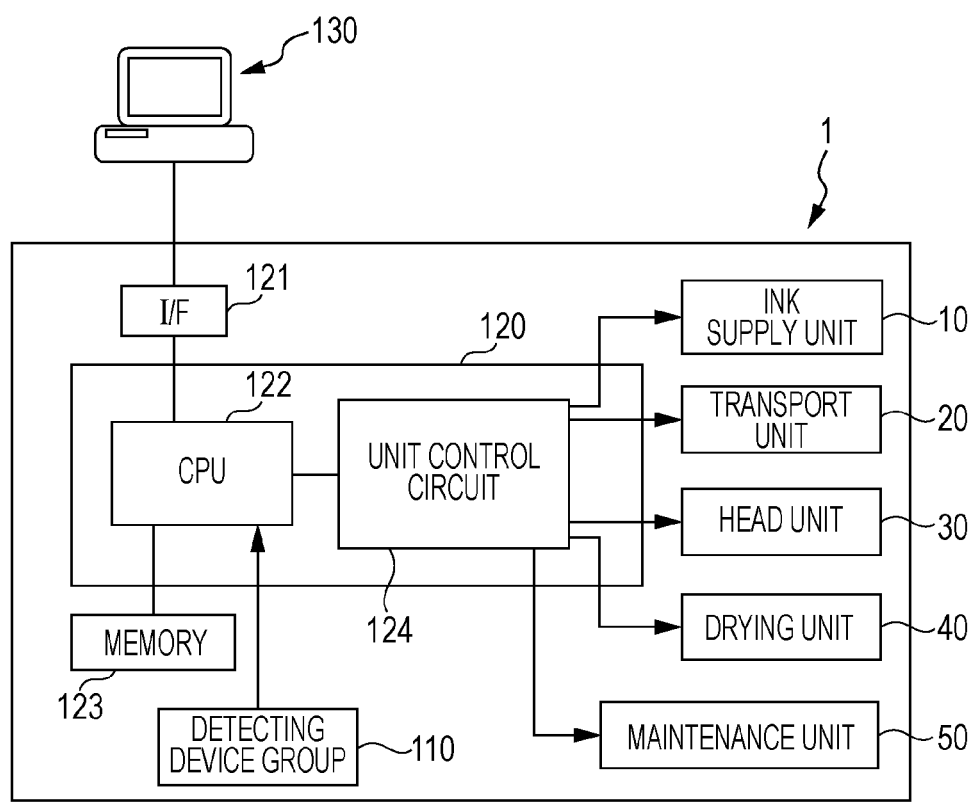
FIG. 2 is a functional block diagram which shows an example of a configuration of a recording apparatus which may be used for the present embodiment.

FIG. 2 shows a functional block diagram which shows an example of a configuration of a recording apparatus which may be used for the present embodiment. A printer driver is installed in a computer 130 and, in order to record an image in the ink jet recording apparatus 1 (also referred to below as a printer 1), printing data corresponding to the image is output to the printer 1. The printer 1 has an ink supply unit 10, a transport unit 20, a head unit 30, a drying unit 40, a maintenance unit 50, a detecting device group 110, a memory 123, an interface 121, and a controller 120. The controller 120 has a CPU 122 and a unit control circuit 124. The printer 1 which receives printing data from the computer 130 which is an external apparatus controls each unit through the controller 120, controls various recording conditions, and records an image on a target recording medium in accordance with the printing data. The situation in the printer 1 is monitored by the detecting device group 110 and the detecting device group 110 outputs the detection results to the controller 120. The controller 120 controls each unit based on the detection results which are output from the detecting device group 110 and stores the printing data which is input via the interface 121 in the memory 123. Control information for controlling each unit is also stored in the memory 123. The drying unit 40 is provided with a heater, a ventilation means, and the like and dries compositions such as ink which are attached to the target recording medium. The computer 130 may be included in the recording apparatus.

EXAMPLES

Detailed description will be given below of the invention using Examples and Comparative Examples. The invention is not limited by the examples below.
Materials for Reaction Solution and Ink
The reaction solution and the main materials for the ink which were used in the examples and comparative examples below were as follows.
Aggregating Agent
Calcium nitrate.4 hydrate
Calcium acetate.1 hydrate
Succinic acid
Pigment
Carbon black
Aggregable Resin
Polyethylene-based resin (manufactured by BYK Japan K.K., product name AQUACER 507)
Organic Solvent
1,2 hexanediol
propylene glycol
Surfactant
Silicone-based surfactant (manufactured by BYK Japan K.K., product name BYK 348)
Preparation of Reaction Solution and Ink
Each of the reaction solution and color ink composition was obtained by mixing and sufficiently stirring each material with the compositions (mass %) shown in Table 1 below.

TABLE 1

| | | Reaction Solution | | | Ink Composition |
|---|---|---|---|---|---|
| Composition No. | | H1 | H2 | H3 | T1 |
| Aggre-gating Agent | Calcium nitrate · 4 hydrate | 19 | 0 | 0 | 0 |
| | Calcium acetate · 1 hydrate | 0 | 15 | 0 | 0 |
| | Succinic acid | 0 | 0 | 4.5 | 0 |
| Coloring Material | Carbon Black | 0 | 0 | 0 | 4 |
| Surfactant | Silicon-based surfactant | 0.6 | 0.6 | 0.6 | 0.6 |
| Aggre- | Poly- | 0 | 0 | 0 | 1 |

TABLE 1-continued

|  |  | Reaction Solution | | | Ink Composition |
|---|---|---|---|---|---|
| Composition No. | | H1 | H2 | H3 | T1 |
| gable Resin Solvent | ethylene-based resin | | | | |
|  | 1,2-hexane diol | 3 | 3 | 3 | 3 |
|  | Propylene glycol | 15 | 15 | 15 | 10 |
|  | Water | Remainder | Remainder | Remainder | Remainder |
| Total | | 100 | 100 | 100 | 100 |
| Aggregating Agent Concentration (mol/1000 g) | | 0.805 | 0.851 | 0.381 | — |

TABLE 2

| | Reaction Solution | Ink | Attachment amount of aggregating agent (nmol/inch$^2$) | Reaction Solution Droplet Density (dpi) | Holding Time T (sec) | Surface Temperature Conditions of Target Recording Medium | Aggregability (Solid Image Quality) | Recorded Matter Durability | Odor | Discharge Stability |
|---|---|---|---|---|---|---|---|---|---|---|
| Example 1 | H1 | T1 | 117 | 1200 × 1200 | 10 | 1 | B | A | A | A |
| Example 2 | H1 | T1 | 468 | 1200 × 1200 | 10 | 1 | A | A | A | A |
| Example 3 | H1 | T1 | 936 | 1200 × 1200 | 10 | 1 | A | B | A | A |
| Example 4 | H2 | T1 | 117 | 1200 × 1200 | 10 | 1 | B | A | A | A |
| Example 5 | H2 | T1 | 468 | 1200 × 1200 | 10 | 1 | A | A | A | A |
| Example 6 | H2 | T1 | 936 | 1200 × 1200 | 10 | 1 | A | A | B | A |
| Example 7 | H3 | T1 | 468 | 1200 × 1200 | 10 | 1 | B | A | A | A |
| Example 8 | H3 | T1 | 936 | 1200 × 1200 | 10 | 1 | A | B | A | A |
| Example 9 | H1 | T1 | 468 | 1200 × 1200 | 20 | 1 | B | B | A | A |
| Example 10 | H1 | T1 | 468 | 600 × 600 | 10 | 1 | B | A | A | A |
| Example 11 | H1 | T1 | 468 | 1200 × 1200 | 20 | 2 | A | B | A | B |
| Example 12 | H3 | T1 | 468 | 1200 × 1200 | 5 | 1 | A | A | A | A |
| Comparative Example 1 | H1 | T1 | 58 | 1200 × 1200 | 10 | 1 | C | A | A | A |
| Comparative Example 2 | H1 | T1 | 1638 | 1200 × 1200 | 10 | 1 | A | C | A | A |
| Comparative Example 3 | H2 | T1 | 58 | 1200 × 1200 | 10 | 1 | C | A | A | A |
| Comparative Example 4 | H2 | T1 | 1638 | 1200 × 1200 | 10 | 1 | A | A | C | A |
| Comparative Example 5 | H1 | T1 | 468 | 1200 × 1200 | 60 | 1 | C | A | A | A |
| Comparative Example 6 | H1 | T1 | 1638 | 1200 × 1200 | 60 | 1 | A | C | A | A |

Examples 1 to 12 and Comparative Examples 1 to 6

A solid pattern (the recording region S1) was formed on NP coated paper manufactured by Lintec Corp. which is a target recording medium by filling the reaction solution and color ink composition which were prepared as described above in a PX-G930 (manufactured by Epson Corp.) and discharging the reaction solution from a head using an ink jet method under the recording conditions shown in Table 2 (the reaction solution attaching step). Here, a head nozzle density of 1200 dpi was used.

Subsequently, the recording region S2 was formed on the recording region S1 by discharging the color ink composition at an attachment amount of 7 mg/inch$^2$ from each head using an ink jet method under the recording conditions shown in Table 2 (the color ink composition attaching step) and was dried for 10 minutes at 60° C. after that. Here, in the reaction solution attaching step and the color ink composition attaching step, the surface temperature of the target recording medium was controlled with the conditions below.

Surface Temperature Conditions of Target Recording Medium

1: In each step from the reaction solution attaching step to the color ink composition attaching step, the surface temperature of the target recording medium was kept at 25° C.

2: In each step from the reaction solution attaching step to the color ink composition attaching step, the surface temperature of the target recording medium was kept at 40° C.

Volatile Component Residual Ratio

The volatile component residual ratio (the drying ratio) of the volatile components of the reaction solution in the recording region S1 before attaching a color ink composition (at the time when the target recording medium is transported to a position which opposes the color ink composition head) was calculated using the following formula.

Here, Af is the total added amount (mg) of the reaction solution which is added to the target recording medium. In addition, Ae is the residual amount of the reaction solution on the target recording medium in a state where the reaction solution is dried (volatilized) sufficiently to use the recorded matter. Furthermore, A is the total mass of the reaction solution on the target recording medium directly before attaching a color ink composition.

$$\text{Volatile component residual ratio \%} = 100 - ((Af - A)/(Af - Ae)) \times 100$$

It is possible to determine Af from the discharge data of the printer and the mass per dot as the added amount of the reaction solution. It is possible to determine A by measuring a mass of the target recording medium at the time of starting to attach the color ink composition and the mass of the target recording medium before the reaction solution attaching step and calculating the difference. It is convenient to use a target recording medium which is prepared for the measurement when measuring the volatile amount of the volatile components. The measurement was carried out using an electronic scale. When measuring, the relationship between the drying time and the volatile amount when carrying out predetermined heating and drying on a platen after adding the reaction solution is determined in advance. When performing recording using a recording apparatus, it is possible to set a desired volatile amount by setting a time from adding the reaction solution to adding the color ink composition to a time corresponding to any relationship between the drying time which was determined as described above and the volatile amount.

The volatile component residual ratio was 90% or more in all the examples and comparative examples apart from Example 11. In addition, the volatile component residual ratio was approximately 50% in Example 11.

Evaluation

Aggregability (Solid Image Quality)

The recording region S2 was visually observed and evaluation was carried out using the evaluation criteria below.
A: There is no unevenness even inside the pattern.
B: There is slight unevenness inside the pattern.
C: There is a lot of unevenness inside the pattern.

Recorded Matter Durability

Evaluation of the scratch resistance of the recording region S2 was performed using a Color Fastness Rubbing Tester AB-301 (product name, manufactured by Tester Sangyo Co., Ltd.). In detail, the recording region S2 was scratched back and forth 50 times by applying a load of 500 g using a friction block to which a white cotton cloth (conforming to JIS L 0803) was attached. Then, the dirtiness of the white cotton cloth and the degree in peeling the image (a coated film) were visually observed. A white cotton cloth to which water was added by dipping the cloth in water and squeezing was used. The recorded matter durability has a tendency to deteriorate due to the moisture absorption of the aggregating agent which remains without reacting.
A: The image is not peeled.
B: It is determined that a portion of the image is slightly peeled.
C: It is determined that the image is peeled.

Odor (Sensory Evaluation)

With regard to the odor of the recorded matter, the recording region S2 was evaluated by sensory evaluation using the following evaluation reference criteria.
A: There is no odor.
B: There is a slight odor.
C: There is an odor.

Discharge Stability

Recording was continuously performed for 30 minutes under the recorded matter creation conditions and whether or not discharge failure occurred in a nozzle of the color ink head during recording was tested using the recorded matter.
A: The number of non-discharging nozzles is 3 or less in one head (1200 nozzles) configuring a line head.
B: The number of non-discharging nozzles is 4 or more in one head (1200 nozzles) configuring a line head.

Examples 1 to 12 which are examples of the present embodiment were excellent in terms of aggregability, recorded matter durability, and odor reduction. It is understood that the aggregability deteriorated in Comparative Examples 1 and 3 where the coated amount of the aggregating agent was excessively small and Comparative Example 5 where the holding time was excessively long. In addition, in Comparative Examples 2 and 4 where the coated amount of the aggregating agent was excessively large, although the aggregability was excellent, the durability of the recorded matter or the odor reduction was poor. On the other hand, in Comparative Example 6, it is understood that although the aggregability was favorable despite the holding time being excessively long, the durability of the recorded matter was poor, possibly because the coated amount of the aggregating agent was excessively large.

The entire disclosure of Japanese Patent Applications No.: 2014-191845, filed Sep. 19, 2014 and 2015-123636, filed Jun. 19, 2015 are expressly incorporated by reference herein.

What is claimed is:

1. A recording method comprising:
attaching a reaction solution to a target recording medium, which forms a recording region S1, wherein the reaction solution includes an aggregating agent which is able to aggregate components of a color ink composition, and wherein an attachment amount of the aggregating agent is from 100 nmol/inch$^2$ to 1000 nmol/inch$^2$; and
attaching a color ink composition to the recording region S1 within 30 seconds of attaching the reaction solution in a state where, with respect to a total mass of 100 mass % of volatile components which are included in the reaction solution before attachment, a volatile component residual ratio of the reaction solution on the recording region S1 is 30 mass % or more, which forms a recording region S2, wherein the color ink composition includes a coloring material and a resin, and
heating the target recording medium for drying the reaction solution before attaching the color ink composition.

2. The recording method according to claim 1,
wherein, in the attaching of the reaction solution, the reaction solution is discharged as liquid droplets and attached to the target recording medium with an attachment density of 600 dpi or more×600 dpi or more.

3. The recording method according to claim 1,
wherein the target recording medium is a low-absorptive recording medium which is a coated paper having a quantity of water absorption at 30 msec from the start of contact is 5 mL/m$^2$ or more to 10 mL/m$^2$ or less according to the Bristow method.

4. The recording method according to claim 1,
wherein the content of the aggregating agent is from 0.090 mol/1000 g to 0.91 mol/1000 g of the reaction solution.

5. The recording method according to claim 1,
wherein a component of the color ink composition which is aggregated by the aggregating agent includes at least one of a pigment, the pigment being included in the coloring material, and the resin.

6. The recording method according to claim 1,
wherein the aggregating agent includes at least one of a multivalent metal salt or an organic acid.

7. The recording method according to claim 1,
wherein, in the attaching of the reaction solution and the attaching of the color ink composition, attachment is performed by performing one scanning with an ink jet head, which discharges the reaction solution or the color ink composition from the ink jet head while changing relative positions of the ink jet head and the target recording medium.

8. The recording method according to claim 1,
wherein a temperature of the recording region S1 of the target recording medium is held at 38° C. or less from the attaching of the reaction solution to the attaching of the color ink composition.

9. The recording method according to claim 1,
wherein, in the attaching of the color ink composition, the recording region S2 is formed by attaching the color ink composition which includes a coloring material and a resin to the recording region S1 in a state where, with respect to a total mass of 100 mass % of volatile components which are included in the reaction solution before attachment, a volatile component residual ratio of the reaction solution on the recording region S1 is 50 mass % or more.

10. The recording method according to claim 1, wherein an attachment amount of the aggregating agent is from 100 nmol/inch$^2$ to 936 nmol/inch$^2$.

11. The recording method according to claim 1, wherein the color ink composition is attached to the recording region S1 within 10 seconds of attaching the reaction solution, which forms the recording region S2.

12. The recording method according to claim 1, wherein a temperature of the heated target recording medium is 40° C. or less.

13. The recording method according to claim 1, wherein the color ink composition is attached to the recording region S1 within 20 seconds of attaching the reaction solution.

14. The recording method according to claim 1, wherein the volatile component residual ratio of the reaction solution on the recording region S1 is 30 mass % to 90 mass %.

15. The recording method according to claim 1, wherein an attachment amount of the color ink composition is 1.0 mg/inch$^2$ to 10.0 mg/inch$^2$.

* * * * *